(12) United States Patent
Stone et al.

(10) Patent No.: US 6,237,630 B1
(45) Date of Patent: May 29, 2001

(54) HVAC DAMPER

(76) Inventors: William L. Stone, 110 Mesa Vista Rd., Grand Junction, CO (US) 81503; Garrick S. Stone, P.O. Box 1333, Palisade, CO (US) 81526

( * ) Notice: Subject to any disclaimer, the term of this patent is extended or adjusted under 35 U.S.C. 154(b) by 0 days.

(21) Appl. No.: 09/352,235

(22) Filed: Jul. 13, 1999

(51) Int. Cl.[7] .............................. F24F 13/10; F16K 17/38
(52) U.S. Cl. ..................... 137/601.12; 137/73; 137/74; 137/601.14; 192/56.56; 251/212; 251/250
(58) Field of Search ..................... 137/73, 74, 75, 137/77, 601.01, 601.12, 601.14, 601.15; 192/56.56, 56.55; 251/67, 212, 250, 901; 454/333, 369

(56) References Cited

U.S. PATENT DOCUMENTS

| | | |
|---|---|---|
| 594,727 | 11/1897 | Cooper . |
| 2,320,007 | 5/1943 | Otto . |
| 2,360,888 | 10/1944 | Peple, Jr. . |
| 2,400,044 | 5/1946 | Hermanson ............................. 98/41 |
| 2,672,088 | 3/1954 | Orr ......................................... 98/14 |
| 2,884,005 | 4/1959 | Honerkamp et al. ................. 137/601 |
| 3,329,163 | 7/1967 | Barker et al. ......................... 137/601 |
| 3,412,755 | 11/1968 | Mason .................................. 137/517 |
| 3,768,512 | 10/1973 | Lahaye ................................. 137/601 |
| 3,847,210 | 11/1974 | Wells ................................... 165/103 |
| 3,958,605 | 5/1976 | Nishizu et al. ....................... 138/46 |
| 4,457,336 | 7/1984 | Allan et al. .......................... 137/601 |
| 4,472,999 | 9/1984 | McCabe ................................. 98/1 |
| 4,506,825 | * 3/1985 | Grant .............................. 137/601.14 |
| 4,535,811 | 8/1985 | Wood et al. ......................... 137/601 |
| 4,555,981 | * 12/1985 | McCabe ................................ 137/75 |
| 4,592,525 | 6/1986 | Magill et al. ........................ 251/298 |
| 5,123,435 | 6/1992 | Blacklin et al. ......................... 137/1 |
| 5,398,910 | * 3/1995 | Kitazawa ............................ 251/250 |
| 5,577,515 | * 11/1996 | Wirfel et al. ......................... 137/75 |
| 5,921,277 | * 7/1999 | Bernal ............................. 137/556.3 |
| 6,019,679 | * 2/2000 | Lloyd .................................. 251/314 |

* cited by examiner

Primary Examiner—Michael Buiz
Assistant Examiner—Ramesh Krishnamurthy
(74) Attorney, Agent, or Firm—Allen H. Erickson

(57) ABSTRACT

A fail-safe HVAC damper apparatus comprises a duct channel with a closure comprising one or more quadri-panel hinged elements, each with four panels connected by four parallel hinge pins. A gear shaft with a toothed gear is controllably rotated to linearly drive a spring-biased plate to move one of the hinge pins of each quadri-panel element between an open and a closed position. A drive motor may be activated to open or close the closure, e.g. by a smoke detector or other controller. A meltable fuse in the duct channel may be connected to a disconnect which uncouples the gear shaft and toothed gear, and a spring moves the closure to a default closed or open position.

22 Claims, 11 Drawing Sheets

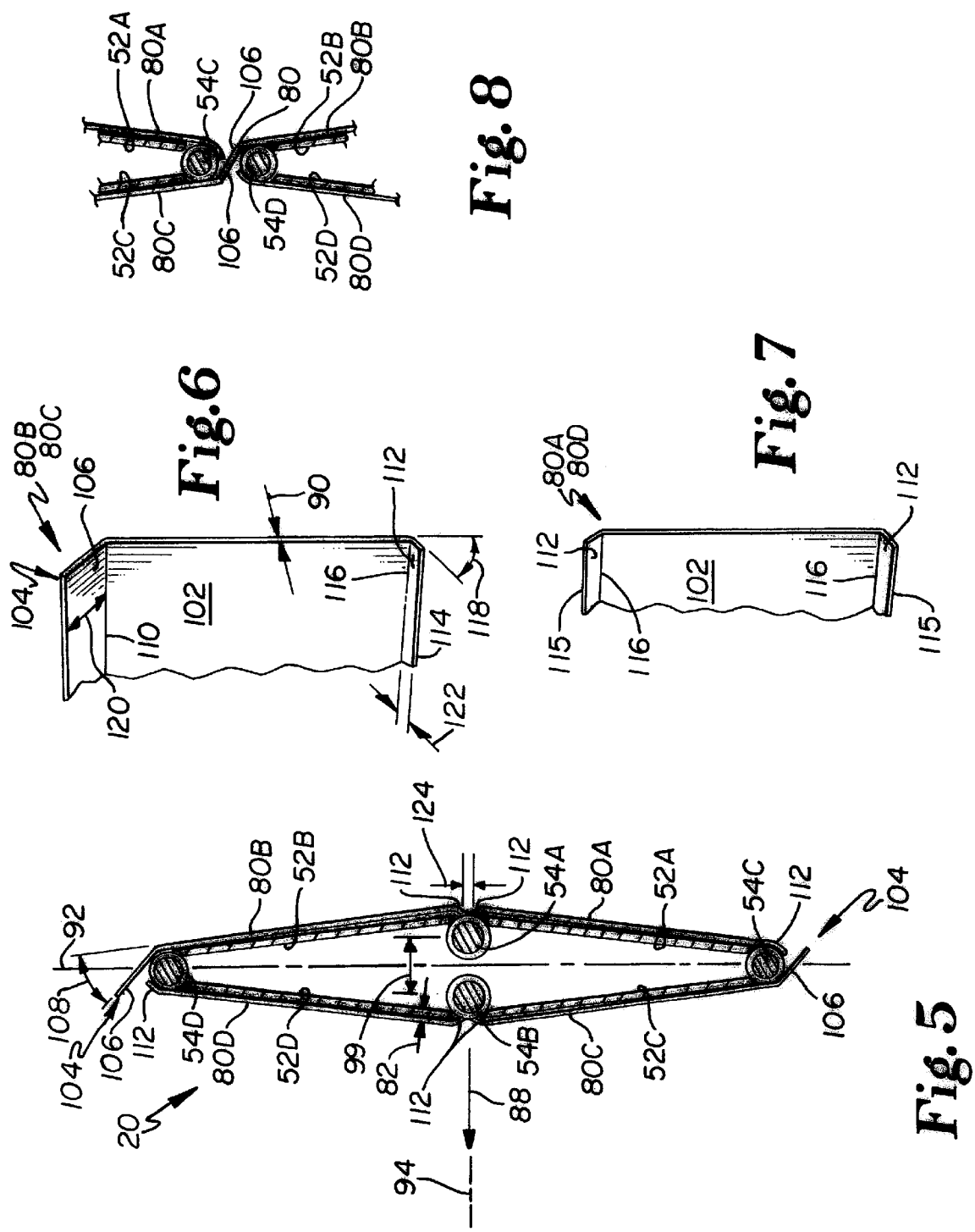

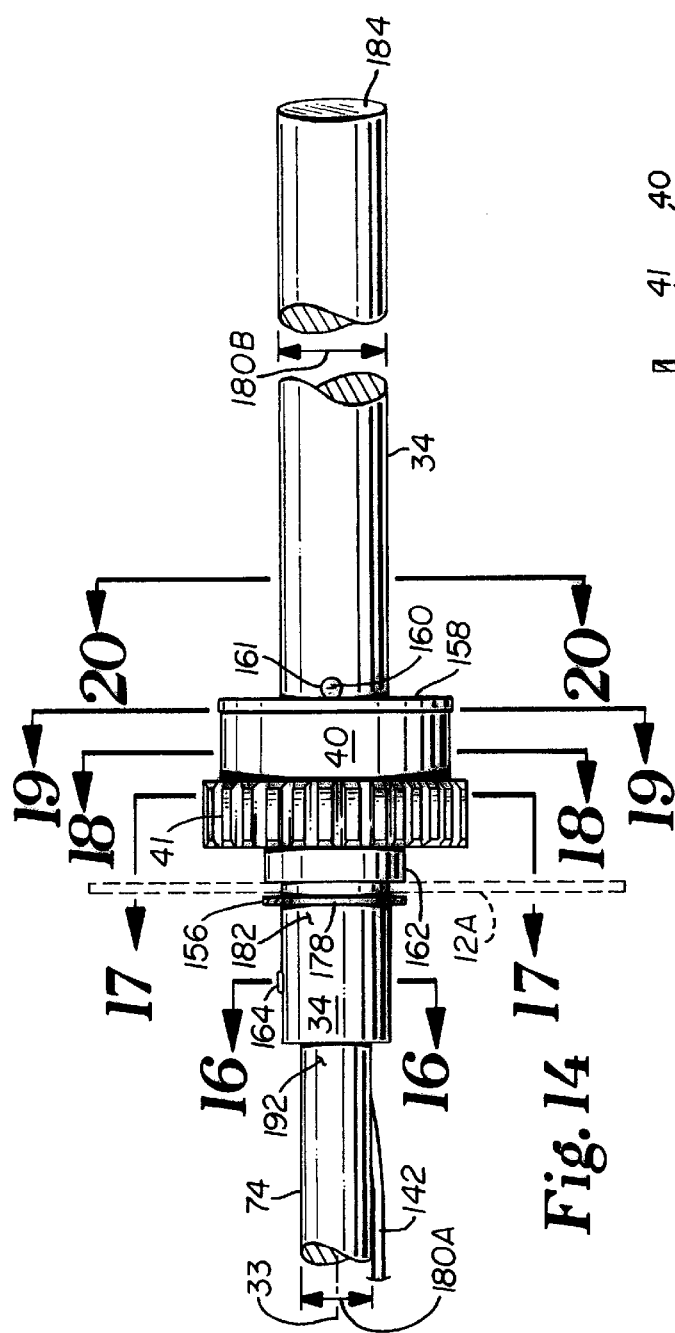
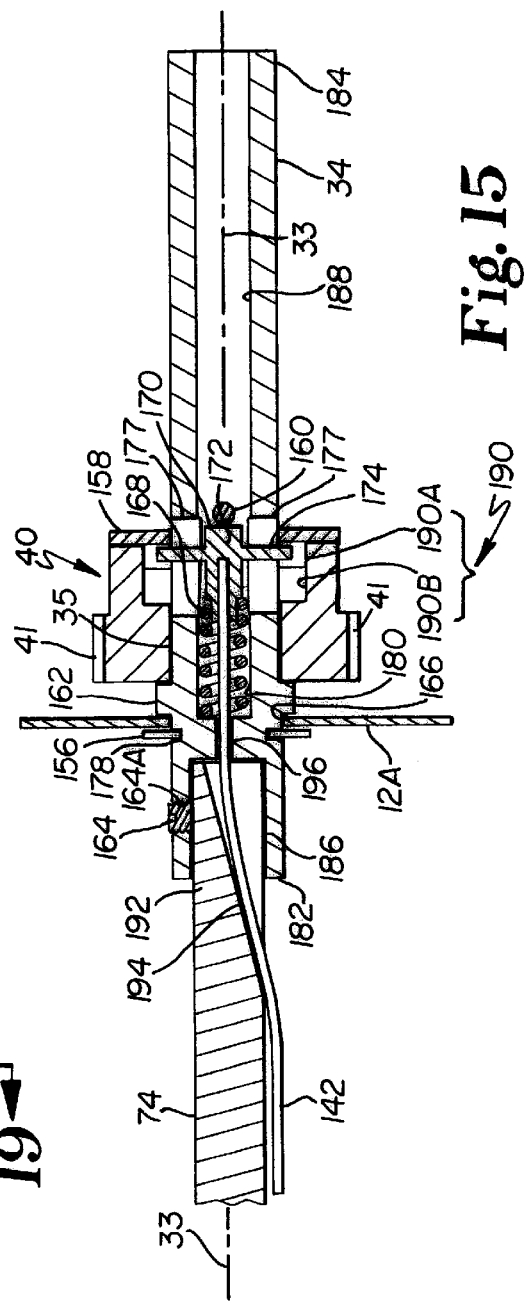
Fig. 14
Fig. 15

HVAC DAMPER

BACKGROUND OF THE INVENTION

1. Field of the Invention

This invention relates generally to dampers for regulating fluid flow. More particularly, the invention pertains to apparatus for dampening gas flows in heating, ventilation and air conditioning (HVAC) applications, including use as a smoke safety damper and/or a fire safety damper.

2. State of the Art

Variable flow dampers have been used for a long time to control air flow rates in heating, ventilating and air conditioning duct systems.

Depending upon the desired purpose, dampers may be quite simple or relatively sophisticated and complex.

A simple "volume damper" is merely a duct insert with one or more internal pivoting blades whose positions are set by a lockable hand lever. Such blades are sometimes referred to as vanes or louvers.

In a more sophisticated "motorized volume damper", the blade position is controlled between an open and a closed position by a shaft rotated by an actuating motor.

In a "smoke damper", the blades are activated when smoke is detected, either within the duct or at some remote location. Typically, the blade actuator motor is activated by a smoke detector to tightly close the blades for minimum leakage. Locking devices are provided to ensure that when in the closed position, the blades will not open without manual intervention, generally requiring access to the inside of the damper.

A "fire damper" is one which closes to prevent flames and high temperature gases from rapidly spreading within a building. Fire dampers are required by U.S. building codes to maintain the required fire resistance ratings of walls, partitions and floors wherever they are penetrated by an air duct. A fire damper must be operable to close even when electric power has been interrupted. Typically, a meltable fuse or thermostat releases the blades so that they automatically slam shut under gravitational force or by a spring at a predetermined temperature, typically about 165° F. (74° C.). In actual practice, the flame temperatures attained may destroy the elasticity of the biasing spring, making it useless for keeping the blades shut under the overpressures experienced.

Many fire dampers are built to be ON-OFF safety devices only, and have no function in general flow control.

It is the view of some in the industry that in most instances, current fire dampers merely act to provide a brief delay in the spread of the conflagration, but any delay time, however small, is of value in reducing injury or preventing loss of life. In any case, current fire dampers rarely survive a fire.

Some dampers are designed to shut under either a smoke detector signal or the presence of high temperature. These "smoke-and-fire dampers" combine the features of both damper types.

Volume dampers with single-hinged blades are shown in U.S. Pat. No. 594,727 of Cooper, U.S. Pat. No. 2,320,007 of Otto, U.S. Pat. No. 2,360,888 of Peple, Jr., U.S. Pat. No. 2,400,044 of Hermanson, U.S. Pat. No. 3,847,210 of Wells, U.S. Pat. No. 4,592,535 of Magill et al., and U.S. Pat. No. 4,472,999 of McCabe. None of these patents shows a damper configured as a smoke damper or fire damper, with the exception of the McCabe patent. In McCabe, a single spring biased blade is moved by a lever attached to a rotatable shaft. The lever/shaft connection is shown as a serpentine bimetallic element which when heated to a predetermined temperature, disconnects the lever from the shaft, permitting the blade to close. The damper may be used for maintaining an open position in the event of e.g. smoke detection; the spring position is altered to bias the damper blade to an open position. The damper cannot be used for opening the blade under one stimulus, i.e. smoke and closing it under another, i.e. fire, since the response depends upon the spring location. Springs installed for each action would cancel each other.

Flexible damper louvers comprising flexible tubular members expanded by internal pressure, movable rods or an engaging member are shown in U.S. Pat. No. 3,329,163 of Barker et al., U.S. Pat. No. 3,768,512 of Lahaye, and U.S. Pat. No. 5,123,435 of Blacklin et al. Practical use of the Barker et al. and Blacklin et al. inventions in a high temperature environment is difficult to envision, and the Lahaye apparatus requires a very complex control system. Furthermore, the flexible thin-skin metal or plastic vanes of Barker et al. and Lahaye will not be very resistant to fire and heat. In addition, repeated bending will lead to cracking and breakage.

U.S. Pat. No. 3,412,755 of Mason describes a pressure actuated valve for a duct wherein duct pressure closes the valve against a force exerted by springs on each side of the duct.

U.S. Pat. No. 3,847,210 of Wells discloses a gear system for simultaneously controlling three streams of gas.

U.S. Pat. No. 2,672,088 of Orr, U.S. Pat. No. 2,884,005 of Honerkamp et al., U.S. Pat. No. 3,958,605 of Nishizu et al., U.S. Pat. No. 4,457,336 of Allan et al. and U.S. Pat. No. 4,535,811 of Wood et al. appear to show dampers with hingedly interconnected blades of differing dimensions. No means for biasing the damper to an open or closed position is disclosed.

The Allan et al. and Wood et al. patents show systems where the blades fold into a framework with windows, and are actuated by a cammed drive.

In Nishizu et al., a four-member vane device with six hingepins and an internal biasing spring is used to maintain a constant airflow, regardless of upstream pressure. An external lever can be used to increase or decrease the spring tension.

In the Honerkamp et al. document, each vane device has four vane panels of unequal dimensions, and a side hinge pin of each vane device is connected to a transverse rod driven by a cam. The apparatus results in a requirement for high applied leverage forces to activate the damper.

The Orr reference describes a damper wherein four-member blade structures have side hinge pins connected to a common member which is moved transversely by a lever.

In each of the above references, the illustrated damper has various shortcomings which limit it use. Where two of the four members are substantially longer than the other members, the damper will not have a fail-safe closure, because increased upstream pressures may open the closure. This is illustrated in FIG. 1, showing a duct 200 wherein a four-member closure 204 of damper 202 has stationary hinge pin 206, drive hinge pin 208, and side pins 210, 212 as shown. When used as a fire damper, drive hinge pin 208 is driven by a spring or other biasing means 214 to close. If the damper 202 is mounted as shown with incoming gas stream 216, static gas pressure 218 against the blade members 220 may open the closed closure 204. If the damper 202 is mounted in the reverse order, i.e. for incoming gas stream 222, the static force 224 tending to open the closure 204 is much greater than the static force 226 tending to keep the closure closed. Thus, the damper 202 is not fail-safe in the event of, for example, loss of the required biasing spring force. Such might be expected in a fire.

The need for a damper which may be used as a true fail-safe smoke damper, fire damper, or combination smoke-fire damper in a variety of modes is evident.

BRIEF SUMMARY OF THE INVENTION

The invention comprises a damper apparatus which may be installed in a duct carrying a gaseous fluid, e.g. heated or cooled air in a heating/cooling system. The damper is configured so that various devices may be readily added to convert the damper from a simple manually controlled volume damper to a tight seal damper, a motorized control damper, a smoke damper, a fire damper, or a combination smoke-and-fire damper.

The damper apparatus has a positive closing feature whereby once closed, increased upstream pressure merely increases the sealing force to prevent opening. Thus, the damper closure will remain in a default closed position even if the spring fails.

In an alternative embodiment, the damper apparatus has a positive opening feature whereby the upstream pressure serves to open and maintain the damper closure in a default open position.

A vane positioner may be e.g. a handwheel or lever for manual operation, or may be motor-driven, and may be installed on either of two opposite sides of the damper where the drive shaft protrudes. The damper apparatus may be installed in the duct system so that the vane positioner is on the top, bottom, or either side of the damper apparatus.

The damper apparatus has an inner duct with open ends which are configured to match the ductwork into which the damper is installed.

Within the inner duct is a closure of one or more quadri-hinge vanes, each of which has four flat or arcuate panels connected by hinge pins along four swivel axes. One hinge pin has its ends mounted to be stationary, and one of the other three movable hinge pins of each vane is actuated by a damper controller to open and close the panels of the vane. Each panel is a flat plane or slightly arcuate to produce a low resistance airfoil in the open position.

In one embodiment, the central movable hinge pin is actuated longitudinally by a driver member, typically a plate, which is normally spring mountedly biased to the closed panel position, but may be biased to the open position for certain applications. A gear shaft with a gear is rotated to linearly move the driver member. The gear shaft may be controllably rotated manually or by a motorized positioner. The positioner may be actuated by a remote controller. A smoke detector may be used to actuate the positioner to e.g. close the damper closure. The damper apparatus may be used as a fire damper, in which a fusible link in the inner duct, when melted, disconnects the gear from the gear shaft and the closure quickly closes under spring force. Easy replacement of the fusible link permits an intact damper apparatus to be reused following an emergency closure.

BRIEF DESCRIPTION OF THE DRAWINGS

The invention is illustrated in the following figures, wherein the elements are not necessarily shown to scale.

FIG. 5 is a cross-sectional end view of a damper blade of the damper apparatus of the invention in a closed position, as taken along line 5—5 of FIG. 4;

FIG. 6 is a perspective end view of a damper blade seal portion of the invention;

FIG. 7 is a perspective end view of another damper blade seal portion of the invention;

FIG. 8 is a partial cross-sectional end view of two adjacent damper blades of the invention showing the interaction of seals in the closed position;

FIG. 14 is an upper view of a portion of a damper drive train in accordance with the invention;

FIG. 15 is a cross-sectional upper view of a portion of a damper drive train along the central axis of a gear and gear shaft of the invention, wherein the gear and gear shaft are motively disconnected;

DESCRIPTION OF THE ILLUSTRATED EMBODIMENTS

An improved fluid-flow damper 10 of the invention is described herein by reference to each of FIGS. 2 through 22.

The damper 10 may be used with any gas-carrying ductwork 14A, 14B, and is particularly applicable to heating, ventilation and air conditioning (HVAC) systems of buildings and the like. The damper structure may be varied so that the apparatus may be alternatively used as:

1. a volume damper,
2. a tight seal damper,
3. a smoke damper,
4. a fire damper,
5. a combination smoke and fire damper, and/or
6. a motorized control damper combined with any of selections 1 through 5, above.

The damper 10 has structure making it particularly adapted for deterring the spread of fire and/or smoke in a conflagration, e.g. through a fire resistant wall, a floor, or other barrier.

Figure 1:
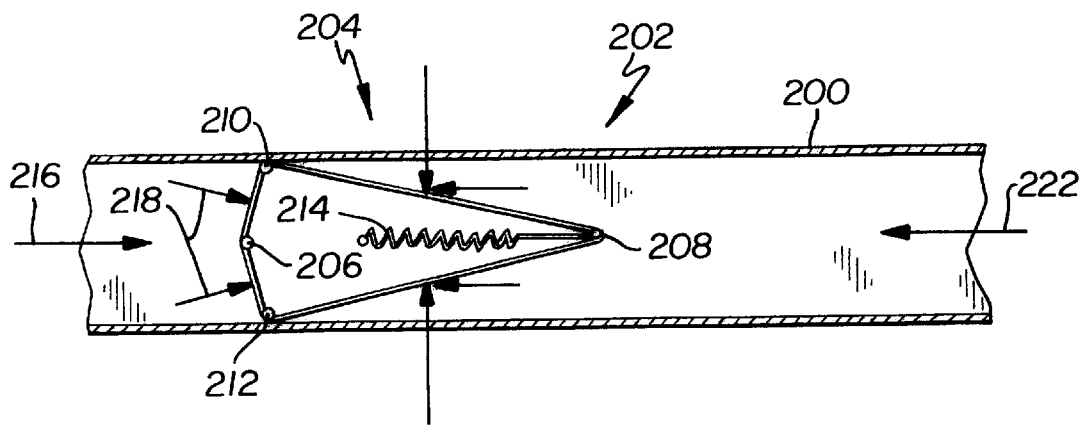
FIG. 1 is a diagrammatic cross-sectional side view of a damper of the prior art.
Figure 2:
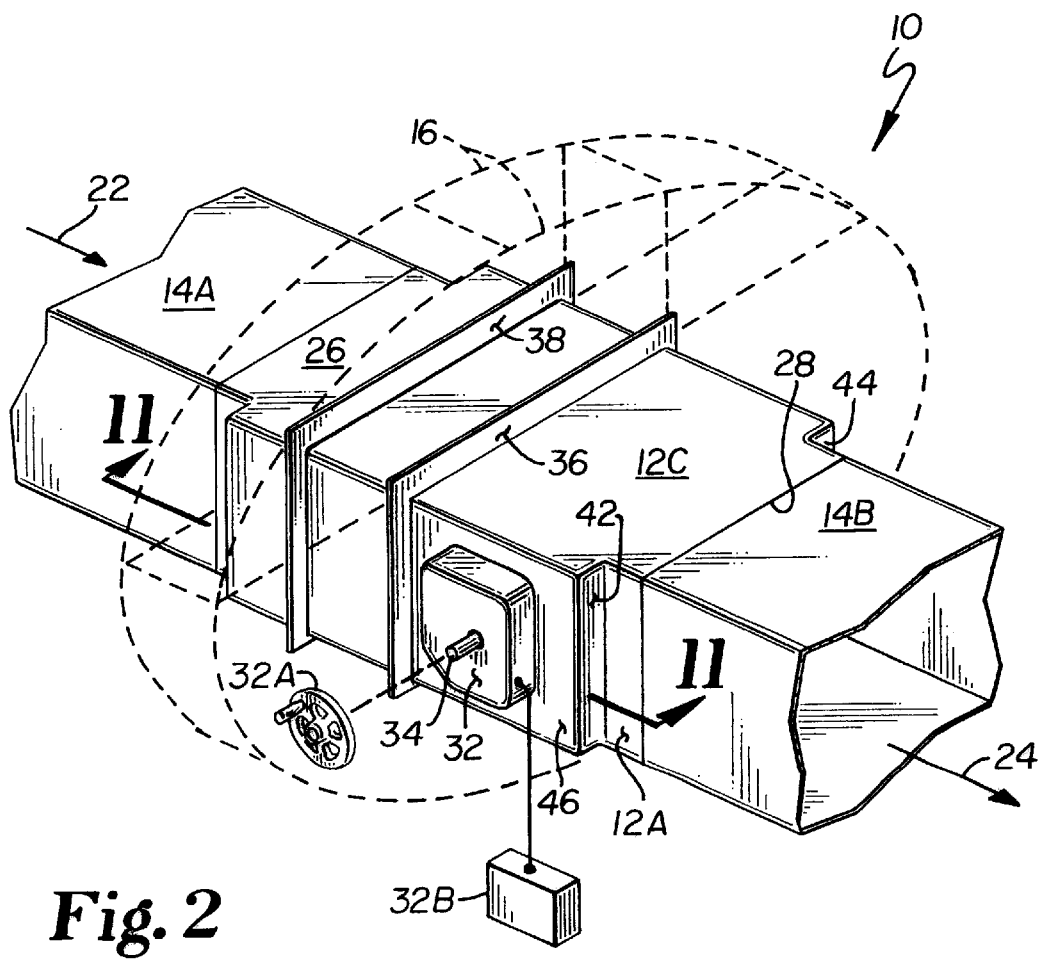
FIG. 2 is a perspective view of a damper apparatus of the invention, shown in a HVAC duct.
Figure 3:
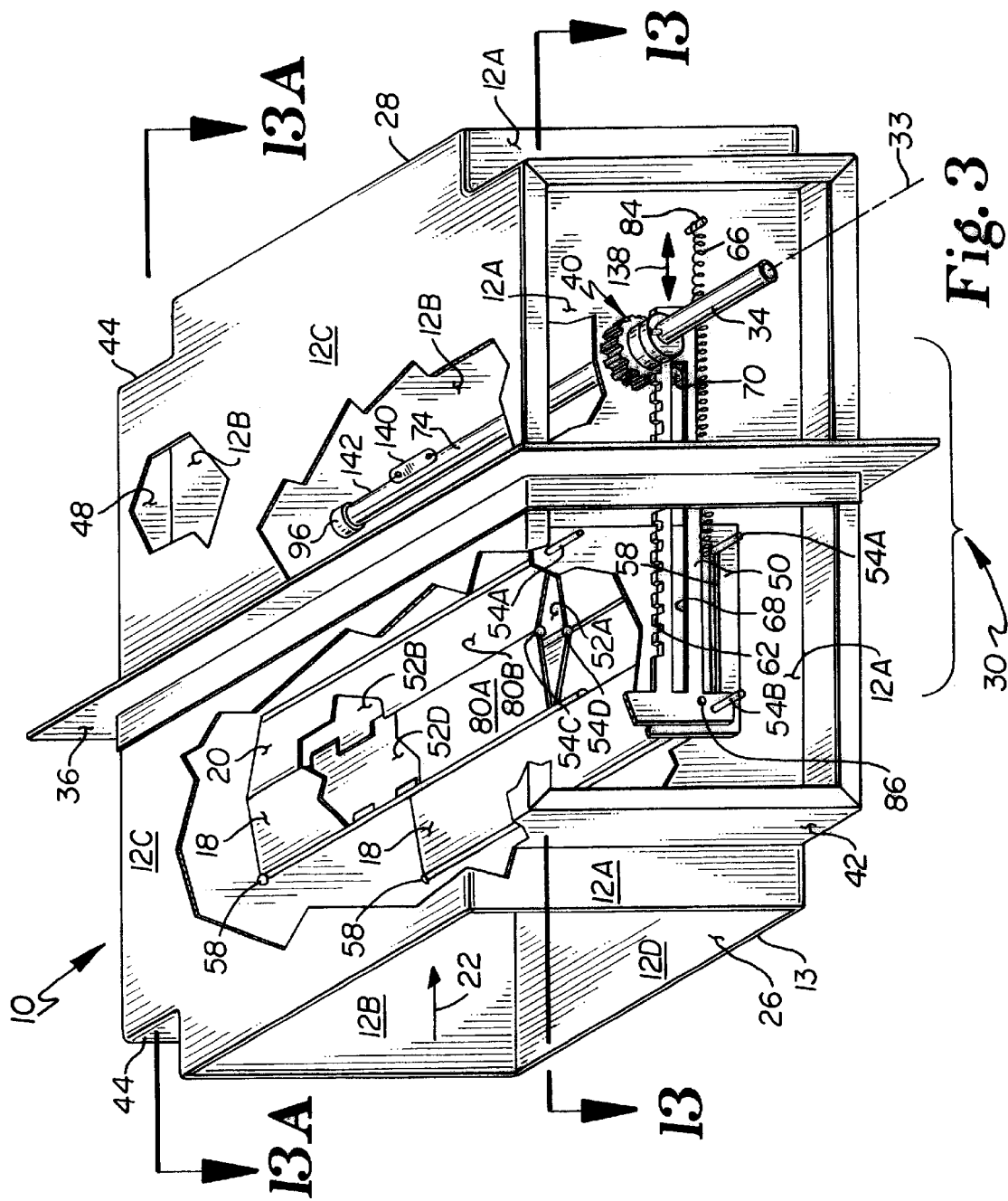
FIG. 3 is a partially cutaway perspective view of a damper apparatus of the invention.

By reference to FIGS. 2 and 3, the damper 10 includes an inner channel 13 defined by walls 12A, 12B, 12C and 12D. The damper 10 is shown with an inlet end 26 connected to an upstream duct 14A for receiving an inlet gas stream 22. An outlet end 28 is connected to a downstream duct 14B for discharge of an outlet gas stream 24. Damper ends 26, 28 may comprise any type of useful duct connection, and may be, for example, any standard duct flanges, or may comprise "flush" joints which are bent to interlock with the ducts, both types of connection being well known in the art.

The embodiment of damper 10 illustrated in FIG. 2 is configured to pass through a barrier 16 such as a fire resistant building wall or floor, for example, shown in hatched lines. A fixed flange 36 of the damper 10 and an adjustably movable flange 38 abut opposite sides of barrier 16.

Figure 13:
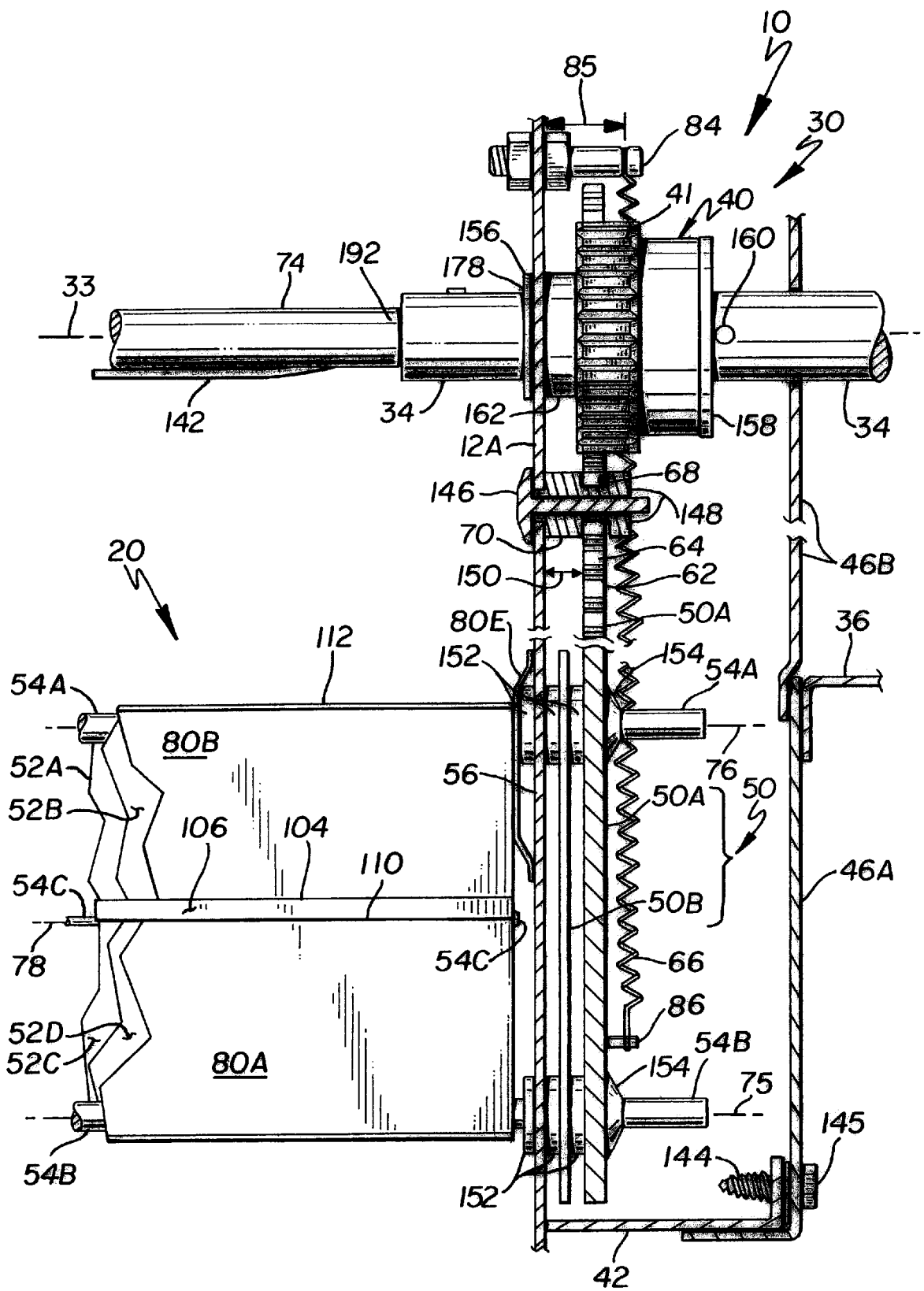
FIG. 13 is a partial upper cross-sectional view of a first damper control compartment showing the drive train of a damper of the invention, as taken along line 13—13 of FIG. 3.
Figure 13A:
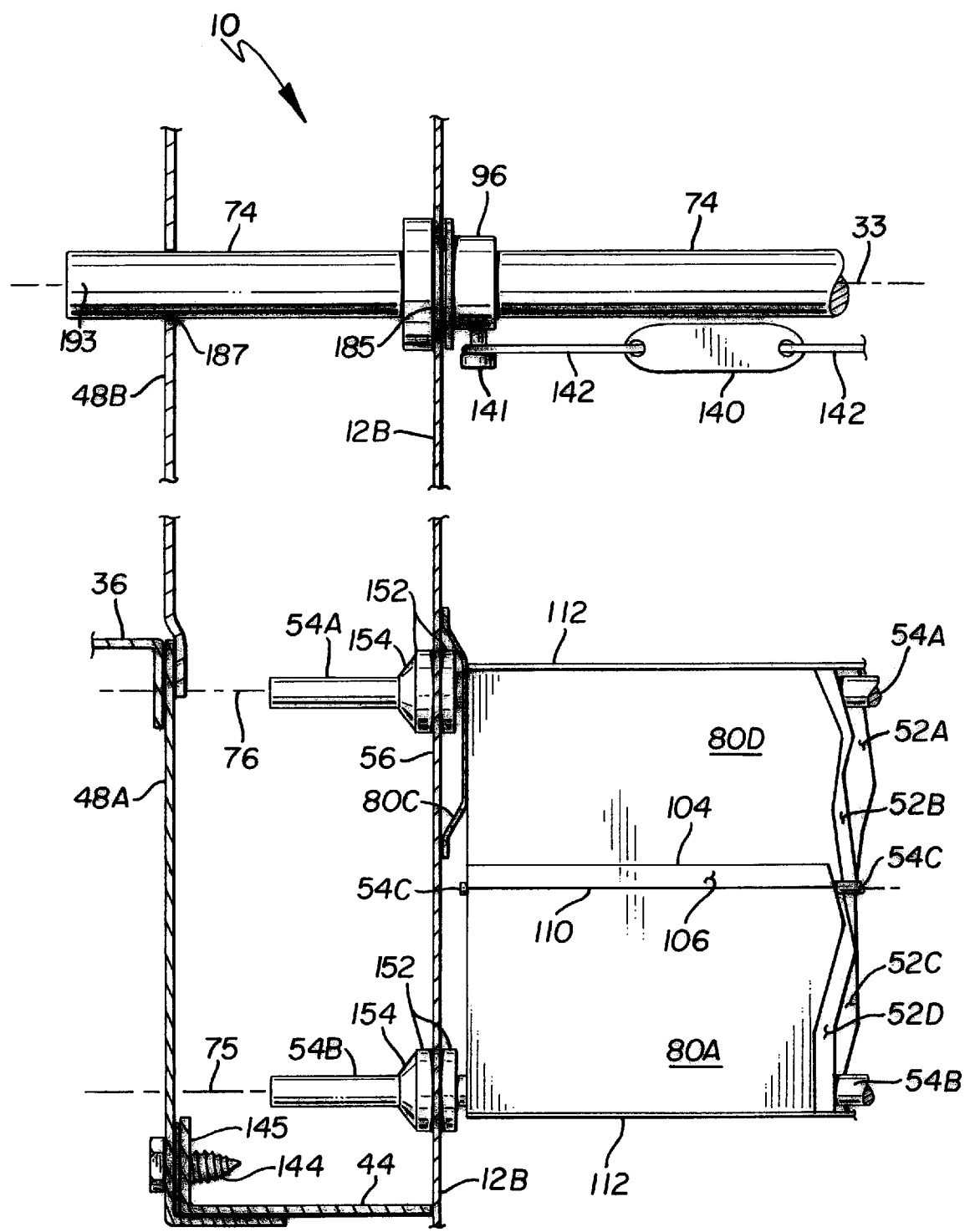
FIG. 13A is a partial upper cross-sectional view of a second damper control compartment of a damper of the invention, as taken along line 13A—13A of FIG. 3.
Figure 15A:
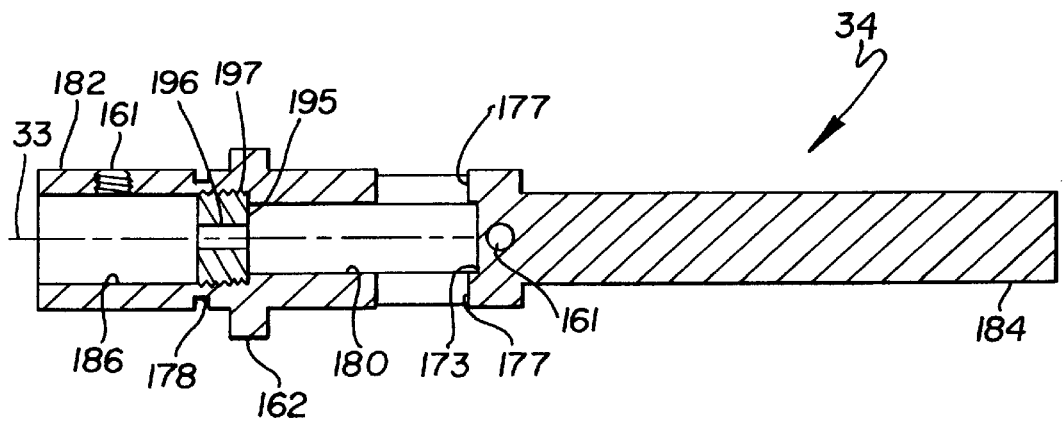
FIG. 15A is a cross-sectional upper view of another embodiment of a gear shaft of the invention.
Figure 21:
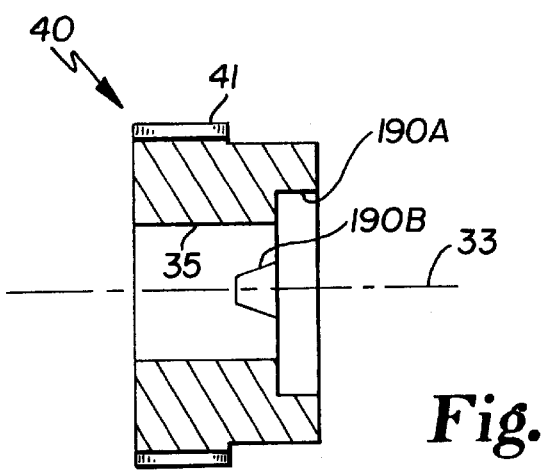
FIG. 21 is a lateral cross-sectional view of a gear of the invention, as taken along line 21—21 of FIG. 20.

Within damper 10 is a damper closure 18 comprising one or more flow control vanes or blades 20 as shown in FIG. 3. The position of blades 20 is controlled between a fully open position and a fully closed position by a drivetrain 30 including a gearshaft 34 passing through walls 12A and 12B. Portions of the drivetrain 30 are enclosed in one or both of first control compartment 42 and second control compartment 44 which extend outwardly from wall 12A and 12B, respectively, and are enclosed with covers 46, 48. As shown in FIGS. 13 and 13A, each of covers 46, 48 may comprise two separate cover portions 46A, 46B, and 48A, 48B, respectively.

Returning to FIG. 2, gearshaft 34 may be rotatively actuated manually, e.g. by an exposed hand lever or wheel 32a, for example, or other device. A simple manually controlled damper 10 will preferably include a locking device to preset the control lever or wheel in a desired constant-flow position. Such locks are well known in the art.

Optionally, or in addition, a motorized positioner 32 may be installed for automatic actuation of the closure 18. Positioner 32 may be connected to the gearshaft 34 where the shaft protrudes from wall 12A and/or wall 12B, i.e. within a control compartment 42, 44, or on the outside of cover 46 or 48. The positioner 32 may be electrically controlled from a distant location if desired, to continuously adjust the closure position in response to some input such as smoke detector 32b. In addition, positioner 32 may be responsive to an emergency situation.

Operation of the closure 18 is not dependent upon gravitational force, so the damper 10 may be oriented in any position as dictated by the particular application, i.e. for gas flow in the horizontal, vertical, or sloping directions.

The drive train 30 includes (a) the gearshaft 34, (b) a gear 40 mounted on the gearshaft 34, (c) a slide assembly 50 having (d) a toothed rack 62 driven by gear 40, and to which is attached (e) a driven hinge pin 54B of (f) the closeable blade 20.

To further describe the drive train 30, and as shown particularly in FIGS. 3, 4, 5 and 6, the closure 18 comprises one or more parallel airfoil shape changing blades 20. Two blades 20 are shown in FIG. 3 in the open position. As further described in the closed position in FIGS. 4 and 5, each blade 20 includes four hinged panels 52A, 52B, 52C and 52D, each of which is connected by hinge pins 54A, 54B, 54C and 54D at hinge joints 60A, 60B, 60C, 60D along two opposing edges to two other panels. Thus, in cross-section (FIGS. 5 and 9), the panels of blade 20 form a four-sided polygon with straight or slightly outwardly arcuate sides (i.e., panels 52A, 52B, 52C, 52D) of equal or nearly equal length. The interpin distance 99 (see FIG. 5) between the stationary hinge pin 54A and the driven hinge pin 54B is at a minimum or near-minimum when the blade 20 is fully closed, and at a maximum or near-maximum when the blade is fully open.

A stationary hinge pin 54A connects panels 52A and 52B along stationary axis 76 and is mounted at one end through damper wall 12A and at the opposite end mounted through wall 12B. For the sake of simplicity, the two panels 52A, 52B will be termed "front panels" herein. Likewise, panels 52C and 52D will be termed "rear panels". However, despite these titles, it is notable that damper 10 may be configured so that fluid flow is from either of damper ends 26 or 28.

A driven hinge pin 54B connects panels 52C and 52D and has one end projecting through a linear slot 56 in damper wall 12A into the control compartment 42, where it is connected to a slide assembly 50. See FIG. 3. Slide assembly 50 has a slot 58 through which stationary hinge pin 54A passes; hinge pins 54A, 54B guide the slide assembly in linear movement. Optionally, driven hinge pin 54B may also pass through a corresponding linear slot 58 in damper wall 12B (compare FIGS. 3 and 13A). The slide assembly 50 includes a rack 62 with gearteeth 64. Rotation of gear 40 on gearshaft 34 in engagement with slide assembly 50 moves the slide assembly in a linear direction, resulting in linear movement of the driven hinge pin 54B to open or close the closure 18. The slide assembly 50 also includes a linear guide slot 68. A guide pin 70 is mounted on wall 12A near the gear 40 to slide in slot 68. The guide pin 70 is a stand-off device which guides the rack 62 of slide assembly 50 in proper axial and radial aligned engagement with gear 40. The lengths of rack 62, slot 68 and slots 56, 58 are determined by the travel required to fully open and fully close the blade(s) 20.

Figure 4:
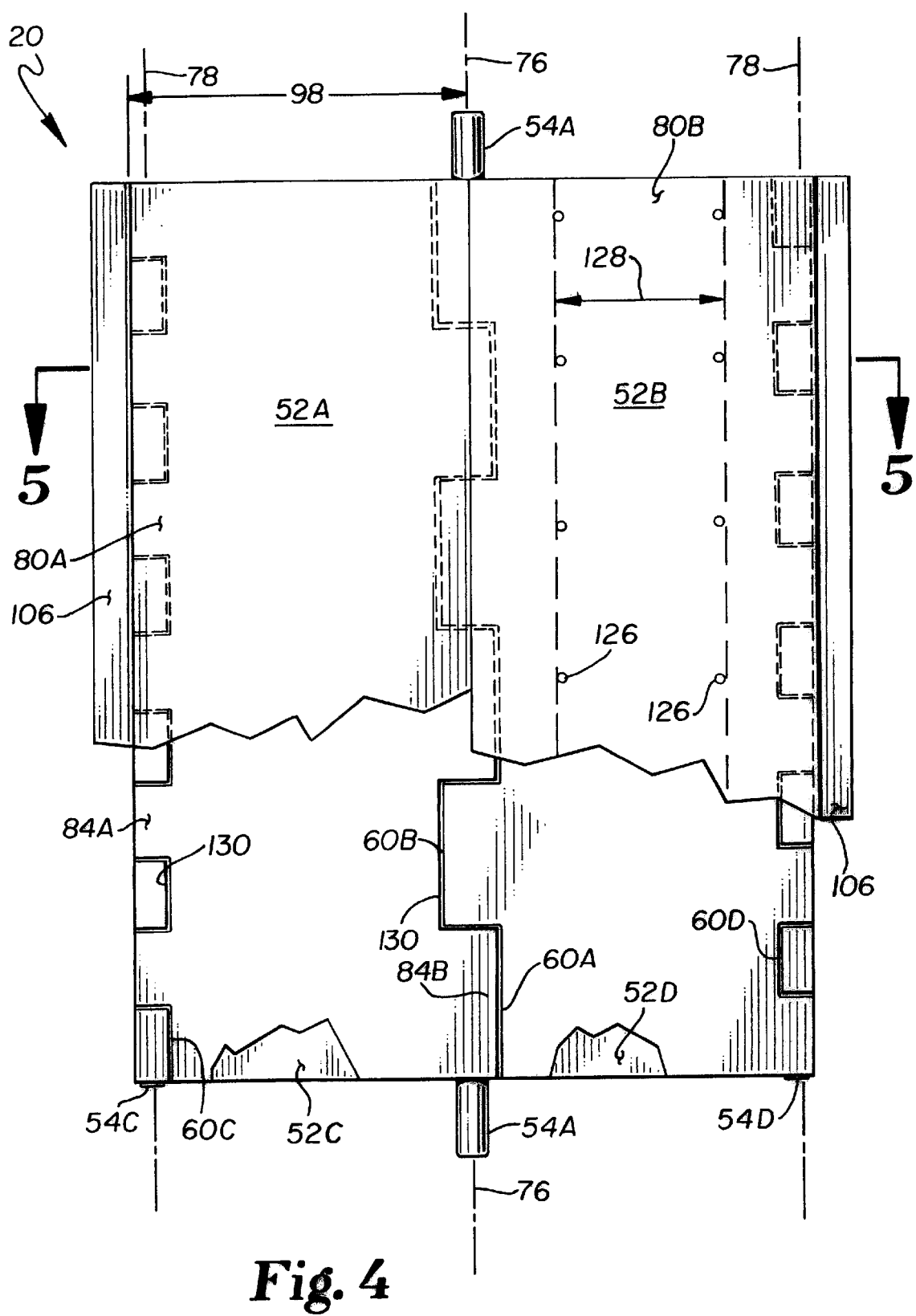
FIG. 4 is a partially cut-away top view of a damper blade of the damper apparatus of the invention.

As shown further in FIG. 4, a blade 20 (shown in the closed position) also has two floating hinge pins 54C, 54D which connect panel 52A to panel 52D, and panel 52B to panel 52C along parallel axes 78, 78.

The hinge joints 60A, 60B, 60C and 60D may be formed by notching each panel side 84A, 84B and bending the projecting (unnotched) portions in a semicircle which will enclose the appropriate hinge pin 54A, 54B, 54C or 54D. As shown in the figures, the panels 52A, 52B, 52C, and 52D may be made to be identical. Savings in time and expense will accrue, and the resulting blade 20 is symmetrical, making installation virtually foolproof.

Each panel 52A, 52B, 52C and 52D is formed of e.g. metal plate of a thickness 82 which provides a very strong blade 20 wherein exascerbated duct pressures which may be encountered under high stress conditions will not bend the panels or unfurl the hinge joints 60A, 60B, 60C or 60D. Thus, for example, panels having a drive pin travel 72 of about 5–12 inches may be formed of steel or stainless steel having a thickness 82 of about $\frac{1}{16}$ inch.

While the blade 20 as described above will, when closed, permit only a small leakage of gas, the device may be enhanced by the application of seals to further prevent gas flow through each blade as well as in the interstices between the blade and the damper walls and adjacent blades.

In a particular feature of the invention, the exterior of each panel 52A, 52B, 52C, 52D is covered with one of seals identified by numeral 80A, 80B, 80C and 80D in alternating or other fashion. As depicted in FIGS. 4 through 8, a damper blade 20 (shown in the closed position) comprises four panels 52A, 52B, 52C and 52D, hinged together by stationary hinge pin 54A, drive hinge pin 54B (directly behind pin 54A in FIG. 4) and floating hinge pins 54C and 54D. The damper blade 20 is opened by moving the drive hinge pin 54B in direction 88, normal to blade center plane (closed) 92 and parallel to blade center plane (open) 94. Thus, the blade 20 has a cross-sectional shape of a four-sided polyhedron with corner angles 100 continuously changeable between a minimum greater than 0 degrees and a maximum less than 180 degrees. Preferably, corner angles 100 vary from greater than about 10 degrees to less than about 170 degrees. In a more preferred form, corner angles 100 vary from about 10 to about 22 degrees in the fully closed position to about 155 to about 168 degrees in the fully open position.

Seals 80A, 80B, 80C and 80D are formed of a thin flexible material, such as a sheet of spring steel having a thickness 90 of from about 0.004 inches to about 0.015 inches, for example.

Seals 80B and 80C are shown in FIG. 6 as having a generally planar section 102 comprising the major portion thereof. A seal wing 106 is formed by bending the seal 80B, 80C along line 110 parallel to first edge 104, at an angle 108 of about 30–55 degrees, and preferably about 40 to about 50 degrees. Seal wing 106 has a width 120 enabling its extension outwardly beyond the end of the blade 20 to sealingly intercept a similar wing 106 of an adjacent blade (FIG. 8), or to sealingly intercept the wall 12C or 12D of the damper channel 13. In FIG. 8, a seal wing 106C of a seal 80C on rear panel 52C interacts with a seal wing 106B of a seal 80B mounted on front panel 52B.

If desired, the interacting seals 80A, 80B may alternatively be both mounted on the front panels 52C, 52D, or alternatively on both rear panels 52A, 52B. In these configurations, the outer edges 104 of the two interacting seal wings will abut each other instead of meshing with each other.

Along second edge 114 opposite edge 104 may be formed a narrow partial crimp 112 by bending along line 116 parallel to second edge 114. Bending angle 118 may be any angle which will lift the edge 114 slightly from the panel 52A, 52B, 52C or 52D to utilize spring force of planar section 102 to ensure forcible contact between crimp 112 and the panel. Angle 118 may thus be any angle between 0 degrees and about 90 degrees, but preferably is on the order of about 5 to about 25 degrees. The width 122 of partial crimp 112 is configured to be sufficient to provide an adequate sealing force and prevent leakage.

Seals 80A, 80D cooperate with seals 80B, 80D and are shown in FIG. 7 as having a major planar section 102 and partial crimps 112 on opposing longitudinal edges 115. Seals 80A, 80D do not have a seal wing 106 extending from the blade 20.

One of seals 80A, 80B, 80C or 80D is attached to the exterior of each of blade panels 52A, 52B, 52C and 52D, typically by spot welding, although other attachment methods may be used. In a preferred embodiment, the attachment 126 is made within the generally central portion of the panel, i.e. within a central portion 128 comprising e.g. about ⅔ of the panel width 98 (see FIG. 4). This permits the central portion 128 to exert a force which retains the partial crimps 112 against the panels for proper sealing.

The ends of blades 20 may be sealed against the walls 12A, 12B by end extensions of seals 80A, 80B, 80C and 80D, or by separate seals 80E which seal only when the blades 20 are closed. In FIGS. 13 and 13A, a seal 80E is depicted mounted on stationary hinge pin 54A and biased against the blade 20 by contact with wall 12A. The seal 80E, formed of spring material like seals 80A, 80B, 80C and 80D has a cutout portion into which drive hinge pin 54B will move when the blade is in the closed position.

Figure 9:
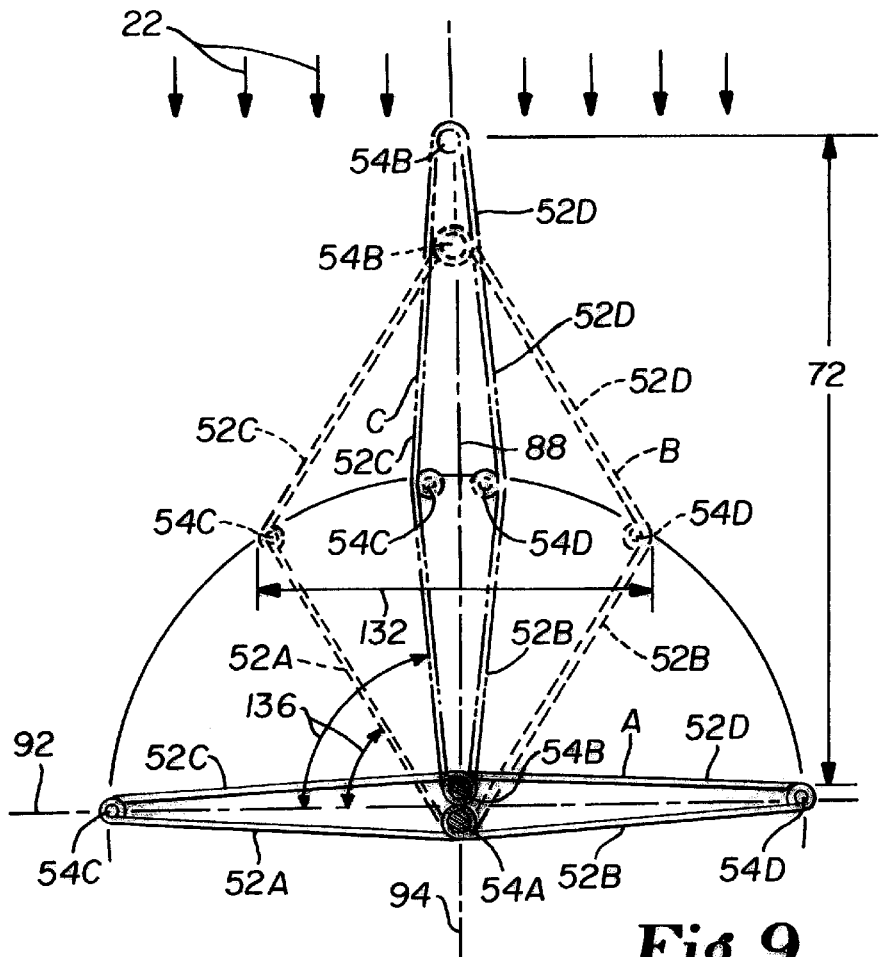
FIG. 9 is a schematic end view of a damper blade of the invention showing movement between a fully closed position and a fully open position.
Figure 10:
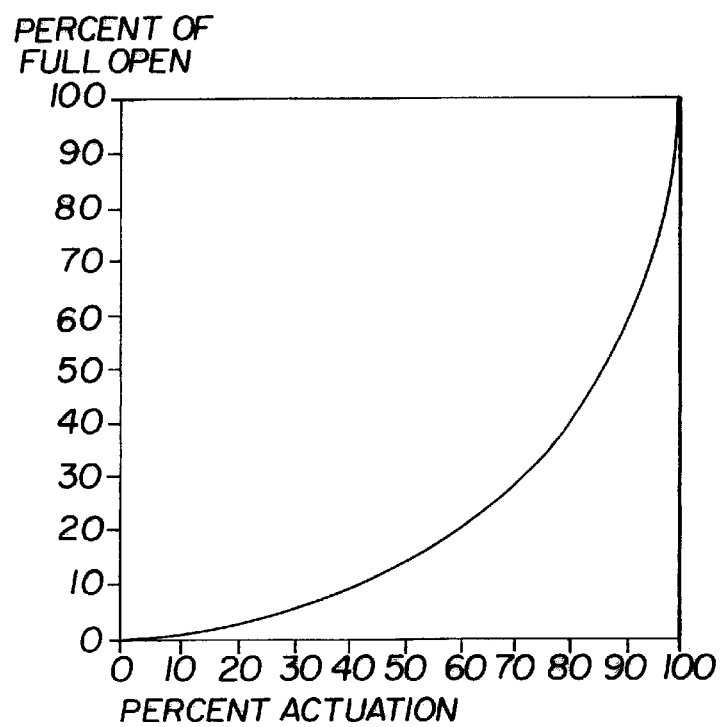
FIG. 10 is a graphical view of an exemplary relationship between the degree of actuation and the resulting gas flow area of a damper in accordance with the invention.

It should be noted that the seals 80A, 80B, 80C, 80D and 80E are required to be effective only when the blade(s) 20 of closure 18 are in the fully closed position A of FIGS. 5, 8, and 9. Thus, when the blade 20 is in the closed position, partial crimps 112 of adjacent seals 80A and 80B closely approach each other, and cover the hinge slots 130. The same is true for adjacent seals 80C and 80D. For example, in a closed blade 20 having a panel width 98 of about 2 to 8 inches, the separation distance 124 between adjacent seals 80A and 80B may be typically less than about ⅛ inch and occurs on the hinge itself, where tolerances are very tight. Thus, very little if any leakage occurs between adjacent seals.

In FIG. 9, a blade 20 is depicted in the closed position A, in a semi-open position B. and a fully open position C. To open the blade 20, driven hinge pin 54B is moved along plane 132 by drivetrain 30, previously summarized. Floating hinge pins 54C and 54D move along circular path 134 from blade center axis (closed) 92 to approach blade center axis (open) 94. The open flow area in the damper 10 is determined as a function of blade width 132 passing through pins 54C, 54D, or the angle 136 between panels 52A, 52B and blade center axis (closed) 92, as shown by example in FIG. 10. It may be noted that the major portion of the actuation distance occurs at lower flows. Thus, for example, 60 percent of actuation opens the closure 18 only about 20 percent of full flow. This enables more precise flow control at the lower flow rates, where control is generally more difficult.

Returning now to other portions of the drivetrain 30 shown in FIG. 3, we see slide assembly 50 which is linearly moved in direction 138 by gear 40, and in turn moves driven hinge pins 54B in slots 56 in damper wall 12A to open and shut the damper blades 20. Slide assembly 50 may take any form attached to driven hinge pins 54B and is shown as including a toothed rack 62, a slot 58 (at least partially coextensive with slot 56) through which stationary hinge pins 54A may slide, means such as guide slot 68 through which guide pin 70 may slide for guiding slide member 50 in proper mesh with gear 40, and biasing means such as spring 66 which biases the slide assembly 50 to a default position, either closed or open. Slot 58 in the slide assembly 50 is at least partially coextensive with slot 56 in wall 12A when the slide assembly is in the open position shown in FIG. 3.

Figure 11:
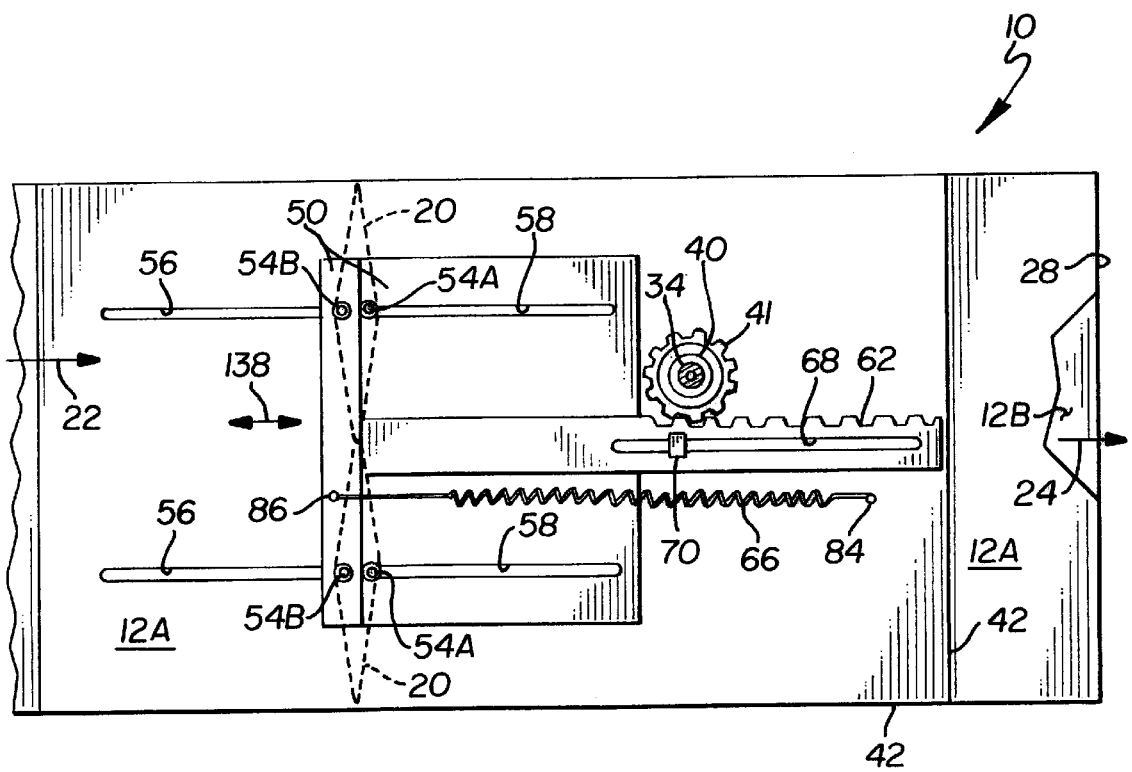
FIG. 11 is a sectional side view of a damper control compartment showing the drive train of a damper of the invention, as taken along line 11—11 of FIG. 2.

In the particular embodiment of FIGS. 3 and 11, spring 66 is attached to wall 12A by attachment 84, and to slide assembly 50 by attachment 86, to motivate slide assembly 50 to a closed default position, as shown. Thus, unless impeded by some other force (such as by the gear 40), the slide assembly will default to the closed position. It is further noted that should the spring 66 break or stretch, upstream gas pressure from gas flow 22 will also tend to close the blades 20 and maintain the blades closed. This "double default" enhances the inherent safety of this damper 10. It is evident that any pressure increase merely tightens the seal.

In the embodiment of FIG. 11, slots 56 in channel walls 12A, 12B lie upstream of the stationary hinge pin 54A.

It is further noted that as shown in FIG. 13, attachment 84 may comprise a standoff which maintains the spring 66 generally parallel to wall 12A. However, the standoff distance 85 may be reduced to position the spring 66 close to wall 12A, thereby reducing the required size of attachment 84.

It is mentioned above that the damper 10 is also bidirectional with respect to fluid flow. Thus, the damper 10 shown in the figures may be reversed in the duct system so that the inlet fluid stream 22 tends to open, rather than close, the damper blades 20. This may be used when it is desired to have the damper 10 default to an open position should the spring 66 break or become non-tensile due to high temperatures.

Figure 12:
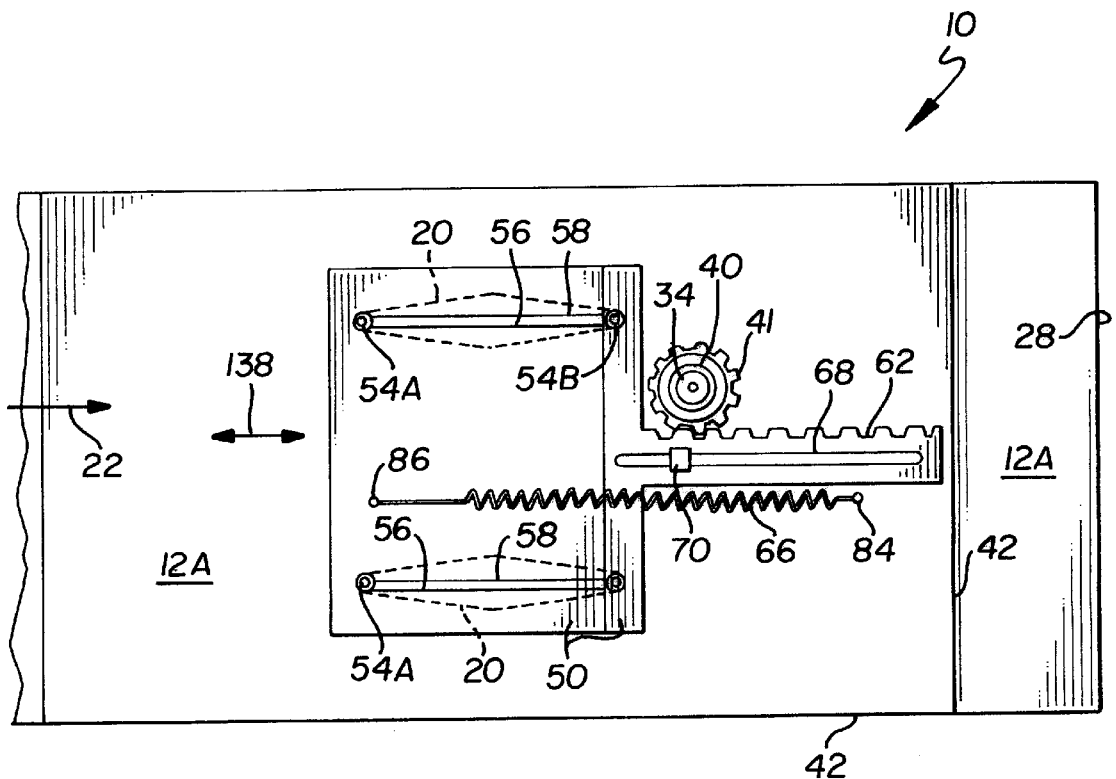
FIG. 12 is a sectional side view of a damper control compartment showing the drive train of another embodiment of damper of the invention, as taken along line 11—11 of FIG. 2.

In another embodiment shown in FIG. 12, the damper 10 is installed as shown, but the upstream hinge pin is configured as the stationary pin 54A, i.e. it is mounted in channel walls 12A, 12B to be stationary. The downstream hinge pin is configured as the driven hinge pin 54B, and moves in linear slots 56 in the channel walls 12A, 12B. In this configuration, the drivetrain 30 moves the driven hinge pin 54B upstream to close the damper blades 20, and slots 56 lie downstream of the stationary hinge pin 54A.

As shown in FIG. 12, the damper 10 is configured to be "double defaulted" in the open position, in that the fluid flow 22 tends to open the blades 20, and the spring 66 does as well. The upstream hinge pin of each blade 20 is installed as the stationary pin 54A, and the downstream hinge pin is attached to the slide assembly 50 and moveable thereby to open and close the blade. Furthermore, the spring 66 is installed to motivate the slide assembly 50 to the open position. Upstream pressure will open the damper 10 should the spring 66 become ineffective. Thus, the damper 10 is fail-safe in the open position.

The direction of spring force in FIG. 12 may be reversed to provide a spring default in the closed position.

Thus, it is evident that in the damper 10 of this invention, the (a) position of the driven hinge, (b) spring force direction, and (c) the direction of fluid flow may each be varied separately to obtain a variety of configurations for different applications.

The slide assembly 50 may be formed as a singular member, as by molding, for example. It may also be formed from commonly available materials such as sheet metal, metal plate, a geared rack, etc, which may be joined as by welding or with fasteners, not shown, or joined by the hinge pins 54A and/or 54B themselves. By comparing the cross-sectional view of FIG. 13 with FIG. 3, it is seen that slide assembly 50 may comprise a rack tee 50A and a linkage plate 50B. Driven hinge pin 54B is connected to the rack tee 50A and slides in linear slot 56 in damper wall 12A. The rack tee 50A has a toothed rack 62 of gear teeth 64 which communicate with teeth 41 of gear 40, the latter rotatable by gear shaft 34 about shaft rotation axis 33. The rack tee 50A is also guided by a guide pin 70 which may be a standoff mounted to wall 12A by a rivet 146 and washer 148 to maintain a desired distance 150 between the wall 12A and the rack tee. Guide pin 70 slides in guide slot 68 in the rack tee 50A and is located proximate the gear 40 in order to maintain proper contact therebetween, and to guide the rack tee 50A in a straight line.

The linkage plate 50B is shown as being generally parallel to the rack tee 50A and spaced therefrom by spacer washers 152 about hinge pins 54A and 54B. Stationary hinge pin 54A slides in slot 58 in the linkage plate 50B. Both hinge pins 54A, 54B are positioned axially to the slide assembly 50 by e.g. push nuts 154. Spacer washers 152 also separate the linkage plate 50B and the blade(s) 20 from the inner wall 12A.

With reference to FIGS. 13 and 14, the damper 10 may be used as a simple volume damper, tight seal damper or electronically actuated smoke damper, in which the damper 10 uses a gear 40 which is fixed to shaft 34. Gear shaft 34 may itself extend across the inner channel 13 to be rotatably mounted in a bearing 96. Alternatively, the gear shaft 34 may be mounted on a continuation shaft 74 which generally spans the inner channel 13, as depicted in the figures. The gear shaft 34 may be rotated by handwheel or lever, or by a powered positioner 32. Inasmuch as the rotational forces exerted on continuation shaft 74 are minimal, the diameter 180A thereof may be substantially less than the diameter 180B of gear shaft 34. Thus, the resistance to gas flow in the damper channel 13 is reduced.

For use as a fire damper or combination fire/smoke damper, the damper 10 has means for defaulting the closure 18 to either a predetermined fully closed or fully open position, irrespective of the gear position. Thus, in a fire, the closure 18 will close or open to the predetermined default condition in the presence of heat, even in the absence of electrical power. Apparatus for enabling improved use as a fire or fire/smoke damper will be described in reference to FIGS. 3 and 13 through 22.

As shown in FIGS. 15–19, gear shaft 34 extends from an outer end 184 through an opening 166 in wall 12A to an inner end 182. Shaft 34 has a flange 162 which rotatably abuts the outside of wall 12A, and an outer groove 178 in which a lock ring 156 may be installed to rotatably abut the inside of wall 12A. The inner end 182 of shaft 34 has a hollow space 186 into which continuation shaft 74 may be coaxially seated and fixed, e.g. with setscrew 164. A hollow space 188 extends inwardly from the outer end 184 of shaft 34. The end portion 192 of continuation shaft 74 has a slanted slot 194 through which disconnect cable 142 may pass. The cable further passes through a restricted hole 196 in shaft 34 into hollow space 188 and is fixed in a spring-biased cog 170. The gear 40 is configured to rotate freely about gear shaft 34 when the cog 170 is in the disconnected position shown in FIG. 15. It is axially held in place by a retainer pin 160 which passes radially through shaft 34 and abuts a spacer washer 158 mounted on shaft 34 to retain the gear 40 in place. The retainer pin 160 also acts as an outer limit to axial movement of the cog 170.

As depicted in FIG. 15 through 22, cog 170 comprises an elongate cog body 172 movable along axis 33 within shaft chamber, i.e. hollow space 188 of gear shaft 34. The cog 170 includes crosspiece fingers 174 which radially project through opposed slots 177 in gear shaft 34 and into a divided chamber 190 radially outside of shaft passageway 35 in gear 40. The divided chamber 190 has an outer circular chamber 190A and one or more slot chambers 190B which extend inwardly from chamber 190A. The slot chambers 190B are large enough to each hold a crosspiece finger 174 in a relatively fixed position. Thus, when the fingers 174 are seated in slot chambers 190B, the gear 40 is motively connected to shaft 34. When the fingers 174 are in the outer circular chamber 190A, rotation of shaft 34 merely rotates the fingers in chamber 190A without moving the gear 40. As shown, the cog 170 is biased by spring 168 so that, without an opposite motivating force, the crosspiece fingers 174 are retained in a disconnected position relative to the gear 40.

Figure 22:
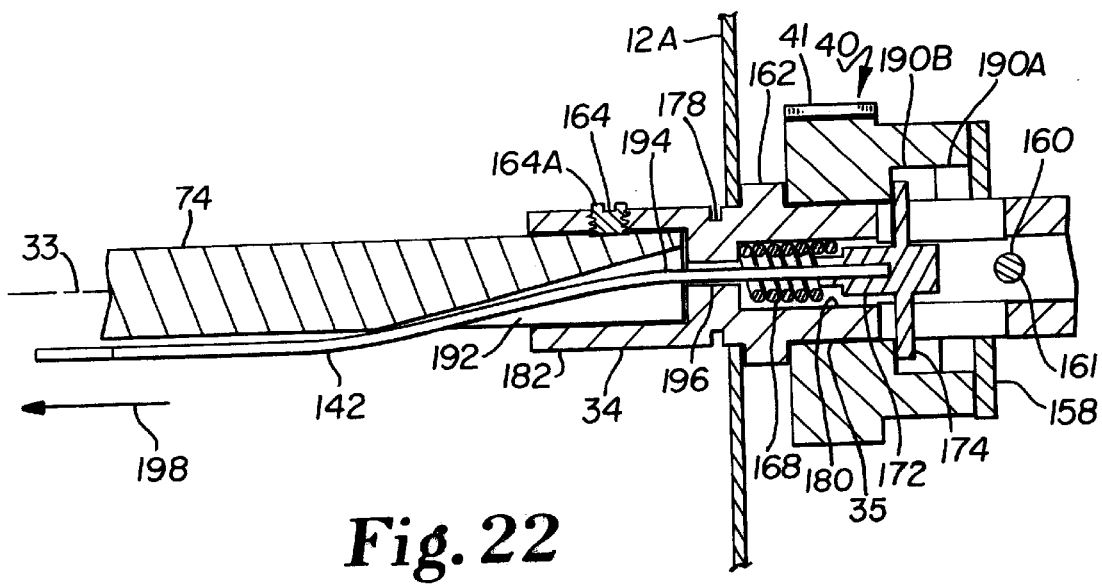
FIG. 22 is a cross-sectional upper view of a portion of a damper drive train along the central axis of a gear and gear shaft of the invention, wherein the gear and gear shaft are motively connected.
Figure 16:
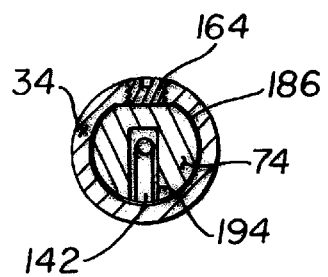
FIG. 16 is an axial cross-sectional view of a gear of the invention, as taken along line 16—16 of FIG. 14.
Figure 17:
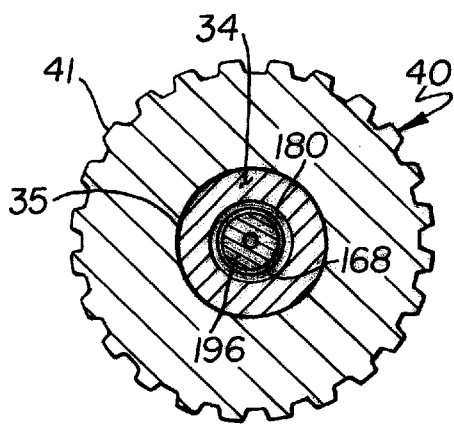
FIG. 17 is an axial cross-sectional view of a gear of the invention, as taken along line 17—17 of FIG. 14.
Figure 18:
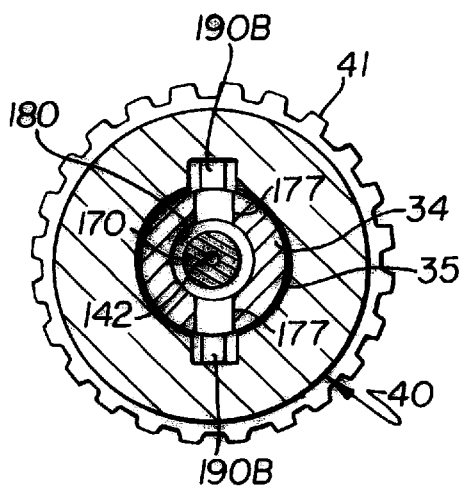
FIG. 18 is an axial cross-sectional view of a gear of the invention, as taken along line 18—18 of FIG. 14.
Figure 19:
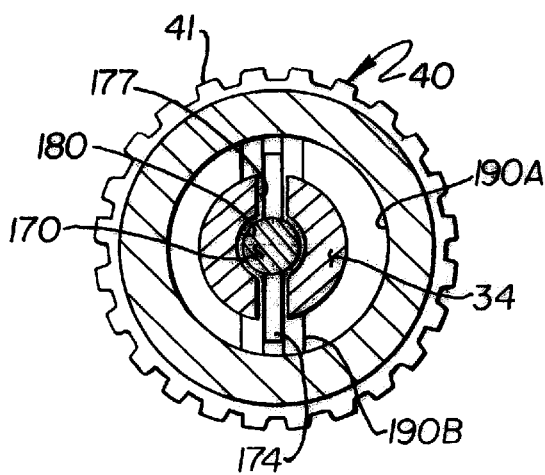
FIG. 19 is an axial cross-sectional view of a gear of the invention, as taken along line 19—19 of FIG. 14.
Figure 20:
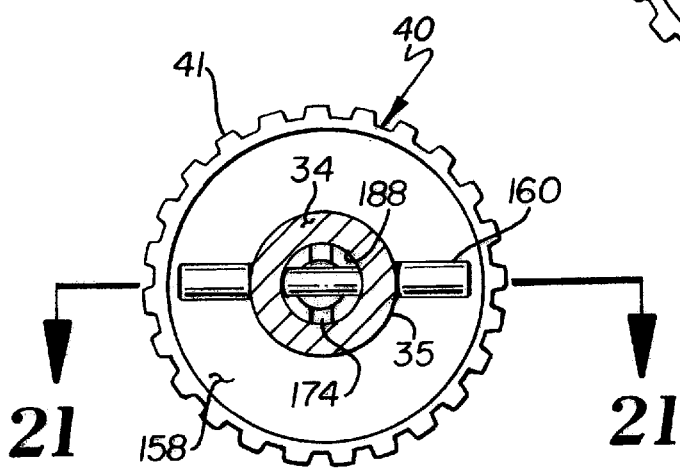
FIG. 20 is an axial cross-sectional view of a gear of the invention, as taken along line 20—20 of FIG. 14.

As depicted in FIG. 3, a fusible link 140 is connected by cable 142 to the cog 170 (see FIGS. 15, 22) by welding, for example, and to a screw or other attachment means 141 on the continuation shaft 74 (see also FIG. 13A), so that shafts 34 and 74, fusible link 140 and cable 142 rotate in common. As shown in FIG. 22, moving cable 142 in direction 198 and affixing it to maintain crosspiece fingers 174 seated in slot chambers 190B results in a drive train 30 which is motivated by rotation of gear shaft 34. Fusible links 140 as known in the art are used to disconnect apparatus in a range of preset temperatures. When a fusible link 140 is melted, it releases the disconnect cable 142 allowing spring 168 to disengage fingers 174 from the slot chambers 190B.

Thus, for example, a fusible link 140 which melts at 135 degrees F. will disconnect the gear 40 from the gear shaft 34, and may be used to automatically fully shut (or optionally fully open) the spring-biased blades 20 at that temperature, overriding the gear setting and independent of possible electrical power loss.

In a broad sense of the invention, the default position of the blades 20 need not be just "fully closed" or "fully open" but in fact may be any intermediate position as well, by limiting the drive pin travel 72 under disengagement conditions. This may be easily accomplished by limiting the lengths of slots 56, 58.

As shown in the views of FIGS. 3, 13 and 13A, the slide assembly 50, gear 40, and spring 66 are all within the first control compartment 42. These parts of the drivetrain 30 may alternatively be installed (as a mirror image) in the second control compartment 44 on the opposite side of the damper channel 13. In use, compartments 42 and 44 have covers 46, 48, respectively (see also FIG. 2). In one form of the invention, covers 46 and/or 48 may be subdivided into several cover portions, e.g. 46A, 46B or 48A, 48B. Thus, for example, the portions of compartments 42 and 44 installed within a fireproof barrier 16 may have fixed covers 46A, 48A and the remainders of the compartments have covers 46B, 48B which are removable for access. FIG. 13 shows a fixed cover 46A attached by screws 144 and with an intervening gasket 145; an exemplary removable cover 46B is also shown. A wide variety of cover configurations may be used. Typically, gear shaft 34 passes through the cover 46 or 48 for external manual or powered actuation.

FIG. 13A shows a fixed cover 48A and a removable cover 48B. Stationary hinge pin 54A is fixedly mounted in wall 12B and driven hinge pin 54B is movably mounted in linear slot 56 in wall 12B. The continuation shaft 74 is shown as passing through a bearing 96 in hole 185 in wall 12B and further through a hole 187 in cover 48B. However, the shaft 74 may be terminated in bearing 96 or in compartment 44 if there is no need for rotating the shaft from its end 193.

The damper 10 of the present invention provides important advantages in the art, in that it enables a wide variety of configurations with minimal changes. The damper is constructed to take advantage of a four-panel quadri-hinge blade with panels of generally the same width. While the upstream panels may have a slightly different panel width 98 than the downstream panels, a difference greater than a few percent i.e. 5 percent, may compromise damper operation. The drive train 30 is generally narrow, taking up minimal space. The motorized positioner 32 or manual control actuator may be positioned on either side of the inner channel 13. The damper does not depend upon gravity for its action, nor is its operation hampered by mounting in any particular position. Furthermore, the damper is bi-directional to expand the options for particular applications.

While a number of different embodiments are described in this application, it is contemplated that other variations may be made to the invention without significantly changing its performance, and fall within the purview of the invention.

It is apparent to those skilled in the art that further additional changes, additions and modifications may be made in the improved damper apparatus as disclosed herein without departing from the spirit and scope of the invention as defined in the following claims.

What is claimed is:

1. A damper apparatus for controlling gas flow in a duct, comprising:

inner walls defining an inner channel for confining a gas flow between inlet and outlet openings;

a closure operable between an open position and a closed position, said closure comprising at least one blade formed of four elongate panels hinged to each other to be rotatable relative each other about four parallel axes;

a stationary hingepin hingedly joining first and second panels, said stationary hingepin having its ends mounted in opposing inner walls of said channel;

a first linear slot in an inner wall of said channel;

a drive hingepin hingedly joining third and fourth panels, said drive hingepin having one end passing through said first linear slot in a first wall of said opposing inner walls and configured to be linearly movable therein for closing and opening said closure;

a first floating hingepin hingedly joining said first and third panels;

a second floating hingepin hingedly joining said second and fourth panels;

wherein said stationary hingepin is positionally opposed to said drive hingepin, and said floating hingepins are positionally opposed;

a slide assembly exterior of said first wall and generally parallel thereto, said one end of drive hingepin mounted to said slide assembly to be linearly moved thereby, said slide assembly including a toothed surface;

a rotatable gear shaft mounted to pass through said first wall; and a gear assembly mounted on said gear shaft wherein said gear assembly meshes with said toothed surface to linearly move said slide assembly and thereby control said closure between an open position and a closed position.

2. The damper apparatus according to claim 1, further comprising a biasing means to bias said closure to one of an open position and a closed position.

3. The damper apparatus according to claim 2, wherein said biasing means comprises a coil spring.

4. The damper apparatus according to claim 2, wherein said biasing means is attached to said slide assembly and to a wall of said damper.

5. The damper apparatus according to claim 1, wherein said inner channel is substantially rectangular in cross-section.

6. The damper apparatus according to claim 1, further comprising means for rotating said drive shaft.

7. The damper apparatus according to claim 6, wherein said means for rotating said drive shaft comprises a manually operated device.

8. The damper apparatus according to claim 6, wherein said means for rotating said drive shaft comprises a motorized positioner with rotating output having controllable start and stop limits.

9. The damper apparatus according to claim 6, wherein said means for rotating said drive shaft comprises a motorized positioner with rotating output controllable to position said closure at values between fully open and fully closed.

10. The damper apparatus according to claim 8, wherein said motorized positioner is configured to receive a signal indicating the presence of smoke and to move said closure to a fully closed position, and to maintain said closed position until manually reset.

11. The damper apparatus according to claim 1, wherein each said panel has a length parallel to each said hinge pin and a width at a right angle to said length, and wherein the variation in width of said panels of a blade is between 0 percent and 5 percent.

12. The damper apparatus according to claim 1, wherein the widths of all panels of a blade are substantially equal.

13. The damper apparatus according to claim 1, further comprising:
 a first linear guide slot in said slide assembly, said stationary hinge pin passing through said first linear guide slot to restrict movement of said slide assembly;
 a second linear guide slot in said slide assembly proximate said gear assembly; and
 a guide pin mounted on said first wall and passing through said second linear guide slot to urge said toothed surface against said gear assembly;
 wherein said slots in said first wall and in said first drive member are parallel, and movement of said first linear guide slot about said stationary hinge pin, and movement of said drive hinge pin and guide pin maintain said first drive member in a linear path parallel thereto.

14. The damper apparatus according to claim 2, further comprising means for disconnecting said gear from said gear shaft to permit said closure to rapidly move to one of a default open position and a default closed position by force of said biasing means.

15. The damper apparatus according to claim 14, wherein said disconnecting means is thermally actuated.

16. The damper apparatus according to claim 14, wherein said damper apparatus is one of a fire damper and a combination fire/smoke damper.

17. The damper apparatus according to claim 14, wherein said disconnecting means comprises:
 a gear wheel with a cylindrical external toothed surface and an internal axial hole;
 a substantially hollow gear shaft passing through said internal axial hole and rotatable within said gear wheel;
 a circular chamber within said gear wheel extending radially from said gear shaft;
 at least one slot chamber axially directed from said circular chamber;
 at least one longitudinal slot in said gear shaft extending longitudinally between said circular chamber and said slot chamber;
 a cog axially movable within said hollow gear shaft, said cog comprising an axial cog body with at least one radial finger extending through said longitudinal slot into one of said circular chamber and slot chamber;
 biasing means to bias said cog and radial finger to said circular chamber;
 means to retain said cog against said biasing means to retain said radial finger in said slot chamber; and
 means to release said cog from said retaining means;
 wherein movement of said radial finger from said circular chamber into said slot chamber motively joins said gear shaft to said gear wheel and biased movement of said radial finger from said slot chamber into said circular chamber disconnects said gear shaft from said gear wheel.

18. The damper apparatus according to claim 17, further comprising:
 a connector fixed to said cog and forcibly maintained in a position whereby said at least one cog finger is seated within said at least one slot chamber; and
 a device connected to said connector for releasing said connector under a predetermined abnormal condition.

19. The damper apparatus according to claim 18, wherein said abnormal condition comprises excessively high temperature.

20. The damper apparatus according to claim 18, wherein said device comprises a thermal fusible link meltable at a predetermined temperature.

21. The damper apparatus according to claim 18, wherein said connector comprises a ligature passing from said cog to be attached to a fusible link connected to said shaft within said inner channel.

22. An apparatus for selectively connecting and disconnecting a gear wheel and a shaft passing axially therethrough, said apparatus comprising:
 a gear wheel with a cylindrical external toothed surface and an internal axial hole;
 a substantially hollow gear shaft passing through said internal axial hole and rotatable within said gear wheel;
 a circular chamber within said gear wheel extending radially from said gear shaft;
 at least one slot chamber axially directed from said circular chamber;
 at least one longitudinal slot in said gear shaft extending longitudinally between said circular chamber and said slot chamber;
 a cog axially movable within said hollow gear shaft, said cog comprising an axial cog body with at least one radial finger extending through said longitudinal slot into one of said circular chamber and slot chamber;
 biasing means to bias said cog and radial finger to said circular chamber;
 means to retain said cog against said biasing means to retain said radial finger in said slot chamber; and
 means to release said cog from said retaining means;
 wherein movement of said radial finger from said circular chamber into said slot chamber motively joins said gear shaft to said gear wheel and biased movement of said radial finger from said slot chamber into said circular chamber disconnects said gear shaft from said gear wheel.

* * * * *